US006247295B1

(12) United States Patent
Hansen et al.

(10) Patent No.: US 6,247,295 B1
(45) Date of Patent: Jun. 19, 2001

(54) HYDRO-MECHANICAL TRANSMISSION SYSTEM FOR AN AGRICULTURAL COMBINE

(75) Inventors: John C. Hansen, Denver; Jeffery D. Frego; David J. Templeton, both of New Holland; Steven C. Young, Lancaster, all of PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/428,847

(22) Filed: Oct. 28, 1999

(51) Int. Cl.[7] .................................................. F16H 47/04
(52) U.S. Cl. .......................................... 56/10.2 A; 475/72
(58) Field of Search ..................... 701/50, 52; 56/10.2 R, 56/10.2 A; 123/361; 200/61.88; 475/72, 79, 81, 82; 477/1, 36, 68; 60/406, 437, 487

(56) References Cited

U.S. PATENT DOCUMENTS

| | | | |
|---|---|---|---|
| 3,905,251 | * 9/1975 | Greene | 74/687 |
| 4,019,404 | 4/1977 | Schauer | 74/687 |
| 4,309,917 | * 1/1982 | Leet | 74/861 |
| 4,663,713 | * 5/1987 | Cornell et al. | 364/424.01 |
| 4,872,536 | * 10/1989 | Yue | 188/290 |
| 4,932,504 | * 6/1990 | Zheng | 188/290 |
| 5,667,452 | 9/1997 | Coutant | 475/81 |
| 5,865,700 | 2/1999 | Horsch | 475/72 |

* cited by examiner

Primary Examiner—Robert E. Pezzuto
(74) Attorney, Agent, or Firm—J. William Stader; Larry W. Miller

(57) ABSTRACT

The invention consists of an engine driving a wet clutch and hydrostatic pump and connected hydrostatic motor. The output of the motor drives the sun gear of a hydro-mechanical planetary drive and the output of the clutch drives the ring gear of the same drive. The carrier is the output and drives the rotors of an agricultural combine. The transmission is controlled by a microcomputer. The microcomputer receives signals from an engine speed sensor and a rotor speed sensor and transmits controlling signals to the hydrostatic pump's swash plate and to a clutch valve allowing a quantity of hydraulic fluid to enter the clutch. The microcomputer can also send a signal to brake the ring gear while reversing the direction of the hydrostatic pump motor to allow act as a reverser for the rotor. The microcomputer also can receive signals from the rotor speed sensor to open the clutch valve allowing a quantity of hydraulic fluid to enter and synchronize the clutch. This allows the clutch to slowly begin to rotate the rotors will at the same time limit damage to the clutch.

18 Claims, 5 Drawing Sheets

HYDRO-MECHANICAL TRANSMISSION SYSTEM FOR AN AGRICULTURAL COMBINE

BACKGROUND OF INVENTION

1. Field of Art

This invention relates to the improvement of a hydro-mechanical transmission on an agricultural combine. More specifically, the invention is controlling the rotation of a threshing rotor on a combine.

2. Description of Prior Art

Mechanical harvesting of grain has taken place for decades. However, efforts continue in the attempt to make harvesting operations more efficient and effective. A combine harvester generally includes a header, which cuts the crop. The header then moves the cut crop into a feeder house. The feeder house lifts the cut crop into the threshing, separation and cleaning areas of the combine. The grain is separated from the stalk by a rotor or cylinder threshing system. The grain is then separated and moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combine harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™ 66, TX™ 68, the New Holland TWIN ROTOR® combines TR® 89 and TR® 99 for examples of existing conventional and twin rotor harvesters. U.S. Pat. No. 4,332,262 also illustrates the primary systems of a conventional harvester. For further details regarding various agricultural harvester systems review U.S. Pat. Nos. 4,522,553, 4,800,711, 4,866,920, 4,907,402, 4,967,544 and 5,155,984. See also the New Holland corn head model 996 and the New Holland grain belt header model 994 for details regarding headers.

The previously mentioned threshing and separating system consists of several elements. These include the rotor, concave, grain pan, sieves and fans. Of critical importance is the control of the rotation of the rotors. Typically, the engine would transmit rotational energy to the rotor by a belt drive. The belt drive could be engaged by a clutch or variable sheave arrangement. However, in order to increase the amount of crop processed by the harvester, the size, weight and power consumption of the rotors are being increased to levels above the tolerances of belt driven technology. To prevent the loss of the belt (and consequently the rotation of the rotor), hydro-mechanical systems have been used to transmit the rotational energy from the engine to the rotor. Additionally, it is difficult to start rotating a heavy rotor under certain crop conditions. Besides placing an enormous amount of stress on the belt drive, there is an enormous amount of stress placed on the clutch used to engage the belt drive. The stress on the clutch can be severe resulting in early clutch failure. Additionally, there are instances where crop becomes plugged between the rotor and concave. In this situation it may be desirable to briefly reverse the rotation of the rotor to force the plug out.

The prior art illustrates these and other difficulties. U.S. Pat. No. 5,865,700 illustrates a hydro-mechanical transmission. The transmission is powered by an engine and hydrostatic motor which derives its' power from the engine. A single clutch controls the input of the engine power and input of the hydrostatic motor power by means of a control circuit. However, if input from the hydrostatic motor is not precisely synchronized the input of the hydrostatic motor could brake the engine resulting in potentially disastrous damage to the engine. U.S. Pat. No. 5,667,452 discloses a split torque transmission and U.S. Pat. No. 4,019,404 discloses a power transmission. In both designs there are limits to the ability to slowly engaging the clutch so as to prevent damage.

A hydro-mechanical transmission that would allow the rotation of the clutch and rotor to be slowly increased without damage to the clutch would be a great improvement. An invention that could resolve these issues would represent an improvement to the art.

OBJECTS OF THE INVENTION

It is an object of the present invention to provide a hydro-mechanical transmission system on an agricultural combine.

It is an object of the present invention to provide a hydro-mechanical transmission system that can protect the clutch.

It is an object of the present invention to provide a hydro-mechanical transmission system can reverse the rotors to allow for the removal of a crop plug.

It is an object of the present invention to provide a hydro-mechanical transmission system that can be easily adjusted and controlled by a microcomputer.

It is an object of the present invention to provide a hydro-mechanical transmission system that provides power to additional items on an agricultural combine.

It is an object of the present invention to provide a hydro-mechanical transmission system that provides a simple method of braking a hydro-mechanical planetary drive.

It is an object of the present invention to provide a hydro-mechanical transmission system that can be used with a drive belt and still protect the clutch.

It is an object of the present invention to provide a hydro-mechanical transmission system that can monitor the rotation of the rotors and use that information to control the synchronization of the clutch.

It is an object of the present invention to provide a hydro-mechanical transmission system allowing for rotor speed control whereby allowing the engine to 'lug' down temporarily in heavy loads without increasing torque and stalling.

It is an object of the present invention to provide a hydro-mechanical transmission system allowing for engagement at lower speeds to reduce the load (inertia) on the clutch then automatically resetting the rotor speed to the desired set speed.

SUMMARY OF THE INVENTION

The invention is an improvement to the hydro-mechanical transmission on an agricultural combine. The invention consists of an engine driving a wet clutch and hydrostatic pump and connected hydrostatic motor. The output of the motor drives the sun gear of a hydro-mechanical planetary drive and the output of the clutch drives the ring gear of the same drive. The carrier is the output and drives the rotors of an agricultural combine. The transmission is controlled by a microcomputer. The microcomputer receives signals from an engine speed sensor and a rotor speed sensor and transmits controlling signals to the hydrostatic pump's swash plate and to a clutch valve allowing a quantity of hydraulic fluid to enter the clutch. The microcomputer can also send a signal to brake the ring gear while reversing the direction of the hydrostatic pump motor to allow it to act as a reverser for the rotor.

The microcomputer also can receive signals from the rotor speed sensor to control the clutch valve depending on the conditions that the agricultural harvester is operating. To ensure the clutch is synchronized and providing the full torque to the rotors, the microcomputer can transmit a signal to the clutch valve allowing a quantity of hydraulic fluid to enter the clutch. Under extremely heavy conditions, the clutch valve may be quickly opened and closed to provide additional hydraulic fluid to the clutch allowing for faster synchronization of the clutch.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
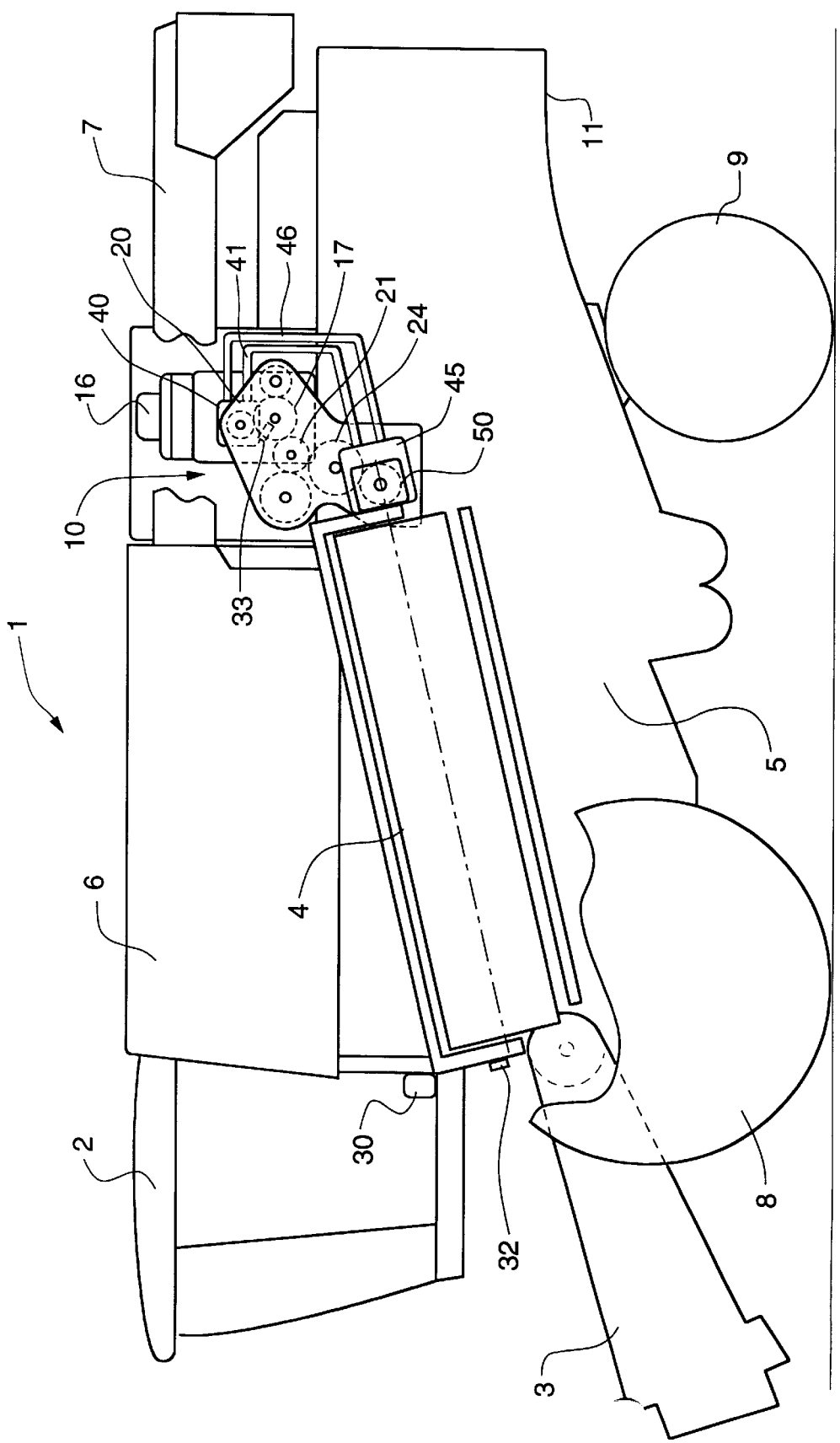
FIG. 1 is a cutaway side view of the combine having the present invention.

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

As seen in FIG. 1, the invention is located on a typical twin rotor combine 1 having a pair of front wheels 8 (only one shown) and a pair of rear wheels 9 (only one shown) for providing movement over the ground. At the front of the combine is a header (not shown) for cutting a crop. As the combine 1 and header are moved forward, the header cuts the grain and stalk. The header moves the grain into an auger trough. A transverse auger pushes the grain and stalk in the auger trough to the center of the header. The header may be positioned and re-positioned relative to the ground. The header may also be tilted to the left or right or may be positioned relatively high or low to the ground. These features are constantly being adjusted depending on the terrain and crop conditions. Moveable headers are well known and established in the art. Located at the rear center of the header is the feederhouse 3 or elevator. The feederhouse 3 moves the grain and stalks rearward into the threshing 5, separation, cleaning and clean grain systems of the combine 1. After processing, separation and cleaning the grain is stored in a grain tank 6 located near the top of the combine 1. The grain is transferred from the grain tank 6 to a transport vehicle by an unloading auger through the grain tank unload tube 7. Usually during the harvesting operations, the unloading auger remains un-driven and the grain tank unload tube 7 remains retracted as shown in FIG. 1. However, the combine can be unloaded 'on the go'. A separate vehicle such as a truck or tractor-pulled grain cart drives beside the moving combine. The processed grain is discharged while the combine and receiving vehicle are moving. The trash or chaff is ejected from the rear of the combine by a chaff spreader 11. The operator controls the combine 1 from the cab 2 located behind the header and at the front of the combine. From the cab the operator can observe most the various combine functions. The cab 2 usually has a large glass window or several windows which afford the operator the maximum ability to monitor the header. The combine 1 and various systems are powered by an engine 15 generally positioned at the rear of the combine 1. Most of the major systems in a combine are discussed and well known in the prior art.

Figure 2:
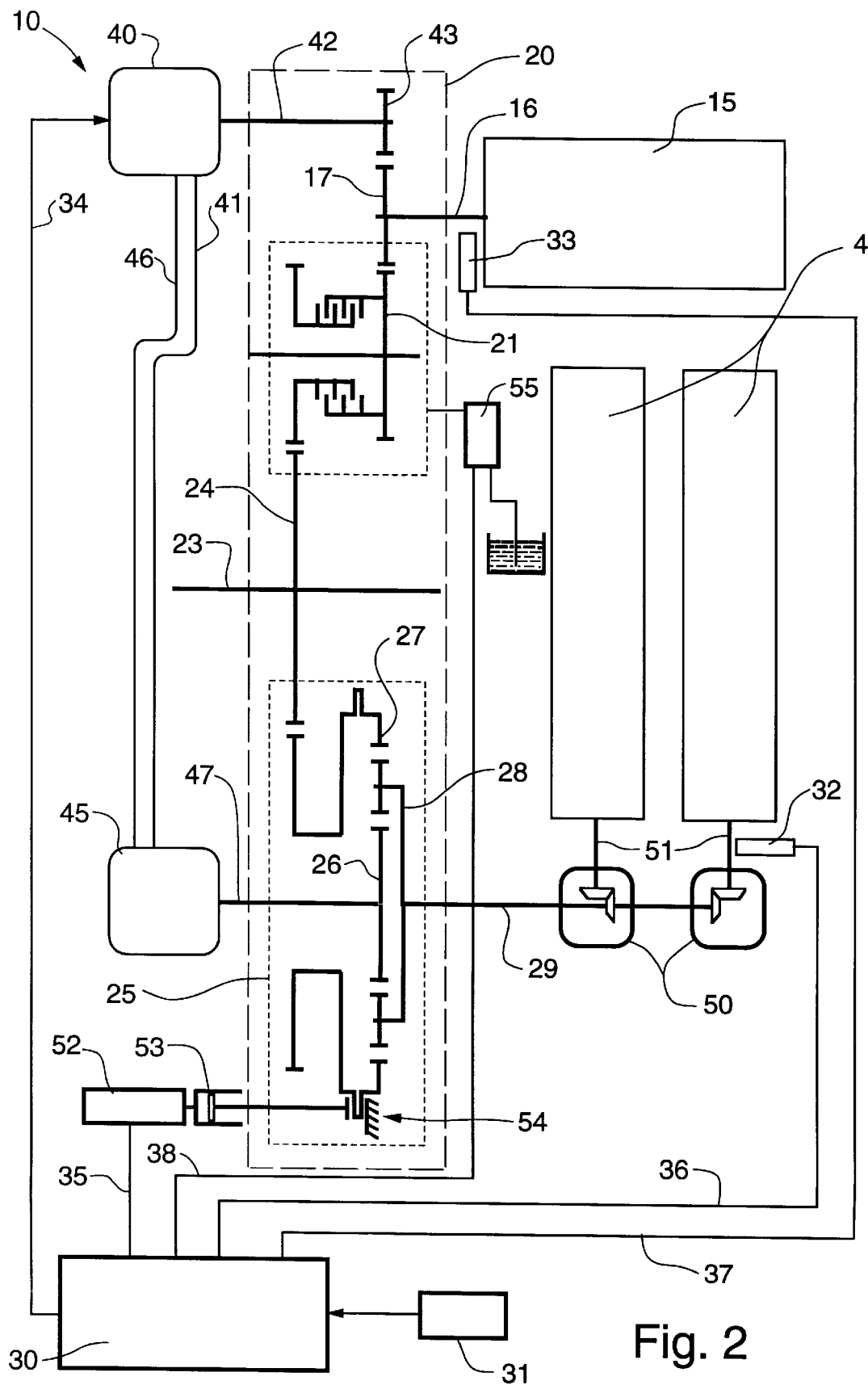
FIG. 2 is a schematic figure showing the hydro-mechanical transmission system.

The present invention focuses on the hydro-mechanical transmission of an agricultural combine as seen in FIG. 1 and represented schematically in FIG. 2. The general elements include an engine 15 powering a gearbox 20. The rotational power from the gearbox 20 is transmitted to the rotors 4 (only 1 visible in FIG. 1). The entire system is controlled by a microcomputer 30 positioned in the cab 2. The microcomputer 30 receives information from an engine speed sensor 35 (proximate to the engine 15) and a rotor speed sensor 32 (proximate to the front of the rotors 4, beneath the cab 2). Using the information received from the sensors 32 and 35, the microcomputer controls the hydrostatic pump 34, the clutch 21 and the hydro-mechanical planetary drive 25.

Now that the general elements have been reviewed, the specific elements of the hydro-mechanical transmission will be discussed in detail. These elements may best be seen be viewing FIG. 2. Typically the engine 15 rotates the engine drive shaft 16 which rotates the engine drive gear 17. The engine drive gear 17 drives the input gear 43 and clutch 21. The input gear 43 drives the input shaft 42 that drives a hydrostatic pump 40. The hydrostatic pump 40 is connected to a hydrostatic motor 45 by the first hydrostatic line 41 and the second hydrostatic line 46. The hydrostatic motor 45 has a motor output shaft 47 that drives the hydro-mechanical planetary drive 25. The hydro-mechanical drive has an output, the rotor drive shaft 29. The rotor drive shaft 29 drives a pair of rotor bevel gear boxes 50. Each rotor gear box 50 drives a rotor gear box output shaft 51. The rotor gear box output shaft 51 rotates a rotor 4.

The single input to the clutch 21, as previously mentioned, is the engine drive gear 17 and the single output from the clutch 21 is the main output gear 24. The main output gear 24 drives both the main output shaft 23 and the hydro-mechanical planetary drive 25. The main output drive 23 can drive the cleaning shoe, clean grain system, returns system and/or the feederhouse 3. In an alternative embodiment, the main output gear 24 could be connected to the rotor drive shaft 29 by means of a convention belt drive. This embodiment would be advantageous for smaller diameter rotors or in lighter crop conditions.

As previously disclosed both the main output gear 24 and motor output shaft 47 drive the hydro-mechanical planetary drive 25. The drive 25 consists of a sun gear 26 driven by the motor output shaft 47, a ring gear 27 driven by the main output gear 24 and carrier 28. The carrier 28 acts to combine the rotation of the ring gear 27 and sun gear 26 as is well known in the art. The carrier 28 rotates the rotor drive shaft 29.

Controlling the hydrostatic pump 40, clutch 21 and hydro-mechanical planetary drive 25 is the microcomputer 30. The microcomputer 30 receives signals from an engine speed sensor 33 and a rotor speed sensor 32. The sensors 33 and 32 are conventional rotational speed sensors which monitor the rotation of the engine 13 and rotor 4. The engine speed sensor 33 sends a signal 37 to the microcomputer. Likewise, the rotor speed sensor 32 sends a signal 36 to the microcomputer 30. The microcomputer 30 can use the information from the sensors 32 and 33 to send a signal 34 to the hydrostatic pump 40. By adjusting the angle of the swash plate in the pump 40, the speed of the hydrostatic motor's output shaft 47 may be adjusted in a conventional and infinitely variable manner. Controlling the clutch 21 is a solenoid controlled clutch valve 55. The opening of the clutch valve 55 allows a quantity of hydraulic fluid to enter the clutch 21 and can control the pressure applied to the clutch 21. The microcomputer 30 transmits a signal 35 to the clutch valve actuating the solenoid and allowing the hydraulic fluid to enter the clutch 21 from a reservoir (not shown). The microcomputer 30 is also capable of sending a signal 35 to a solenoid actuated valve 52. This valve 52 controls a conventional piston and cylinder arrangement that extends to contact a brake 54. The brake 54 is affixed to the ring gear 27 of the hydro-mechanical planetary drive 25. The actuation of the valve 52 extends the piston and cylinder 53 and prevents the rotation of the ring gear 27. In another embodiment, the brake 54 could be a park pawl contacting one the gear teeth on the ring gear 27. The microcomputer 30 also has a switch 31 that allows the operator to set the desired speed of the rotors 4 in the microcomputer 30.

Figure 4:
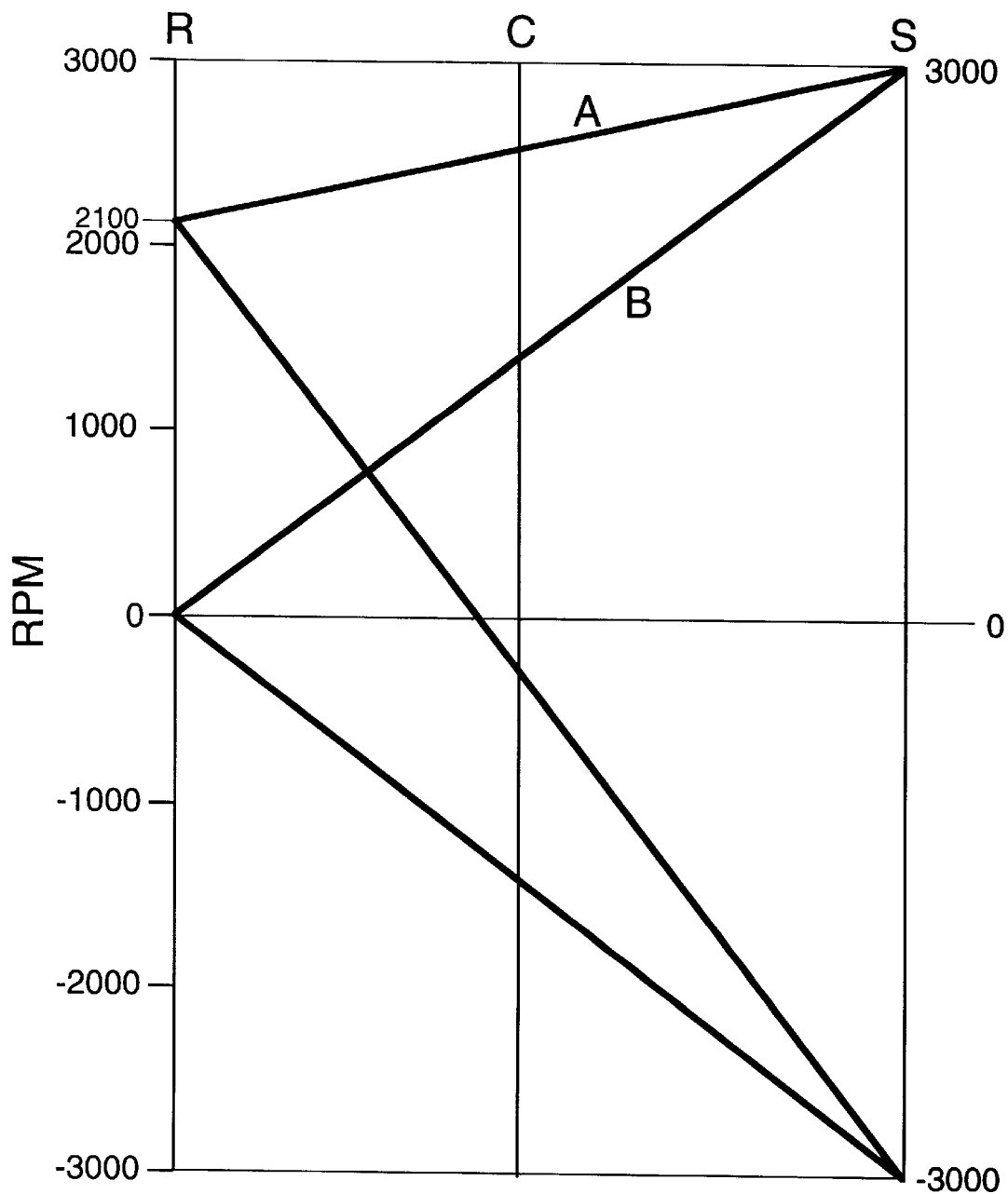
FIG. 4 is a graph illustrating the rotational speeds of the sun, ring and carrier gears in the hydro-mechanical planetary drive.

During regular farming operations with the clutch 21 engaged, the engine 15 drives the engine drive shaft 16 that rotates the engine drive gear 17. The engine drive gear 17 drives the clutch 21 and the input gear 43 to the hydrostatic pump 40. The output of the clutch 21 is transmitted to the ring gear 27 by the main output gear 24. The hydrostatic pump 40 drives the hydrostatic motor 45. The hydrostatic motor rotates the motor output shaft 47. The motor output shaft 47 drives the sun gear 26. The ring gear 27 and sun gear 26 can result in a rotational range of speed and power being transmitted to the carrier 28 and consequently the rotor 4. In this manner the engine 16 may be operated at peak efficiency and by adjusting the swash plate on the hydrostatic pump 40 the rotor's speed can be altered. In the preferred embodiment, as illustrated in FIG. 4, the engine 16 and ring gear 27 are rotating at a fixed rate of 2100 revolutions per minute (rpm). The hydrostatic motor 45 (as adjusted by the hydrostatic pump 40) has an approximate range of +3000 rpm to −3000 rpm. The carrier 28 or rotor 4 speed can be adjusted from a range of approximately 400 rpm to 2400 rpm (as indicated in FIG. 4). Adjustments to the speed of the rotor 4 is accomplished by the microcomputer 30 receiving a signal 36 from the rotor speed sensor 32 and comparing that speed to the signal 37 received from the engine speed sensor 33. Speed control of the rotors is based on a percent or ratio of engine speed. In a typical operation, the operator starts the combine with the engine at low idle. The operator then engages the clutch 21 and increases the engine speed to the 'rated' speed (approximately 2100 rpm). The operator then sets the desired rotor speed (with no crop in the rotors 4). The transmission uses a hydrostatic pump and motor so it is possible for these device to have some internal leakage that increases with higher loads, therefore it is necessary to continuously monitor and control the rotor speed so that the rotor speed does not decrease due to this leakage. Typical speed control would only compare actual rotor speed signals to the desired set point. The present invention adjusts the speed based on a ratio of the engine speed/rotor speed. For instance, if the engine is set at 2000 rpm and operator sets the rotor speed to 1000 rpm, then the ratio is ½. If the operator then reduces the engine speed to 1000 rpm, the rotor speed would decrease to 500 rpm. This is advantageous because when operating in very heavy crop conditions (at maximum engine power) and a slug load of crop enters the rotors, the engine will lug down and increase the torque output. With the present control system, the motor speed will also decrease resulting in an indication to the operator that the machine is overloaded and that the operator needs to lower the rotor power thus allowing the engine to recover. Without this control, the engine would lug down and the rotor speed would also decrease. However, the operator would try to increase rotor speed to maintain speed. This is undesireable because the controller would more try to deliver more hydraulic power and thus lug the engine down further eventually stalling the engine.

In order to reverse the rotation of the rotors 4 so as to eject plugged crop material, the microcomputer 30 sends a signal 35 to the solenoid actuated valve 52 while ensuring the clutch 21 is disengaged. This valve extends a piston cylinder 53 into contact with a brake 54 preventing the movement of the ring gear 27. The microcomputer 30 also signals 34 the hydrostatic pump 40 the reverse the angle of the swash plate, thus reversing the rotation of the hydrostatic motor 45 and motor output shaft 47. This reverses the rotation of the sun gear 26, rotor drive shaft 29, the rotor gear box output shaft 51 and ultimately the rotors 4. As seen in FIG. 4, when the ring gear 27 is braked, the carrier 28 and rotor speed can range from approximately +1000 rpm to −1000 rpm.

Figure 3:
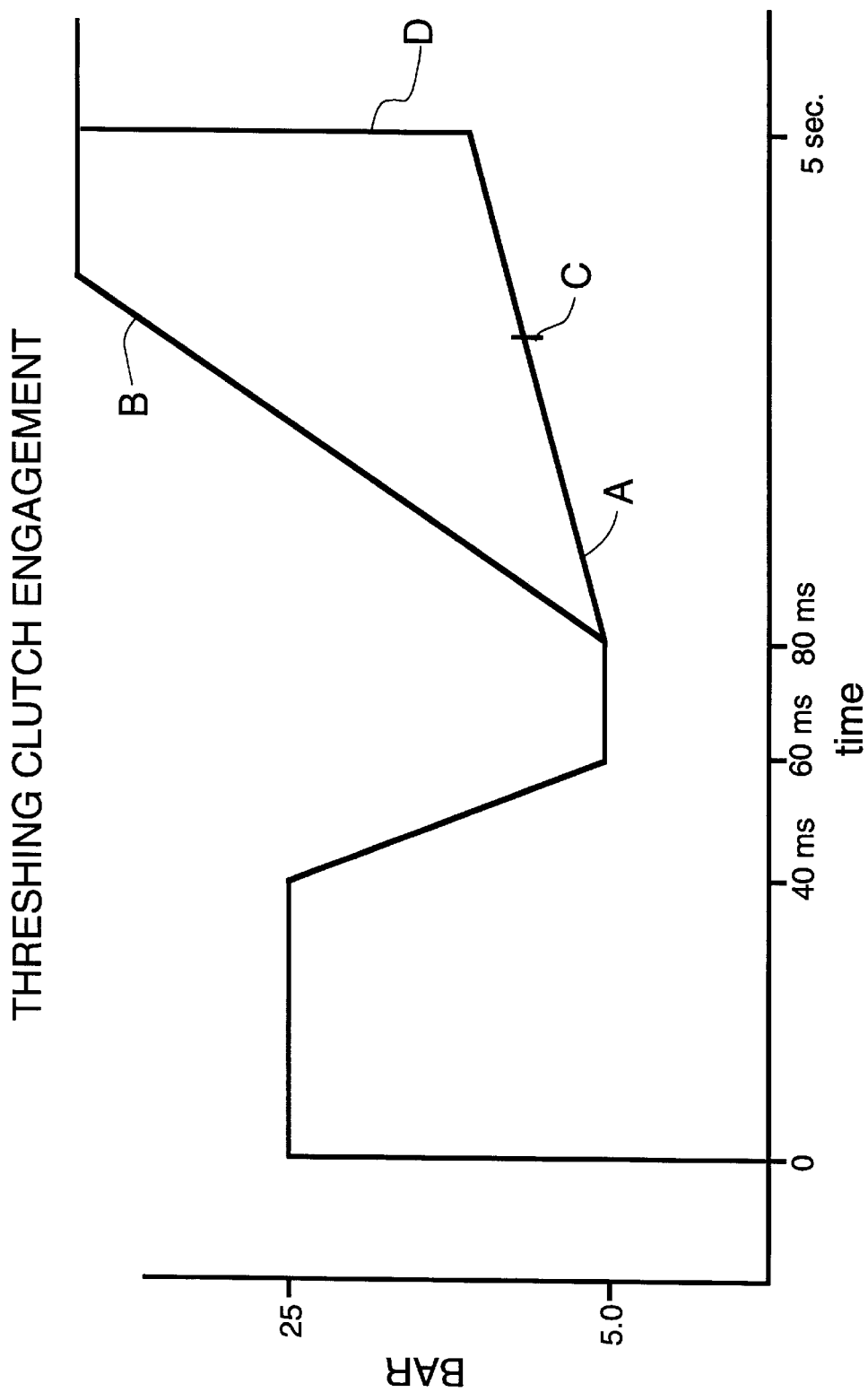
FIG. 3 is a graph illustrating the pressure versus time effecting the clutch.
Figure 5:
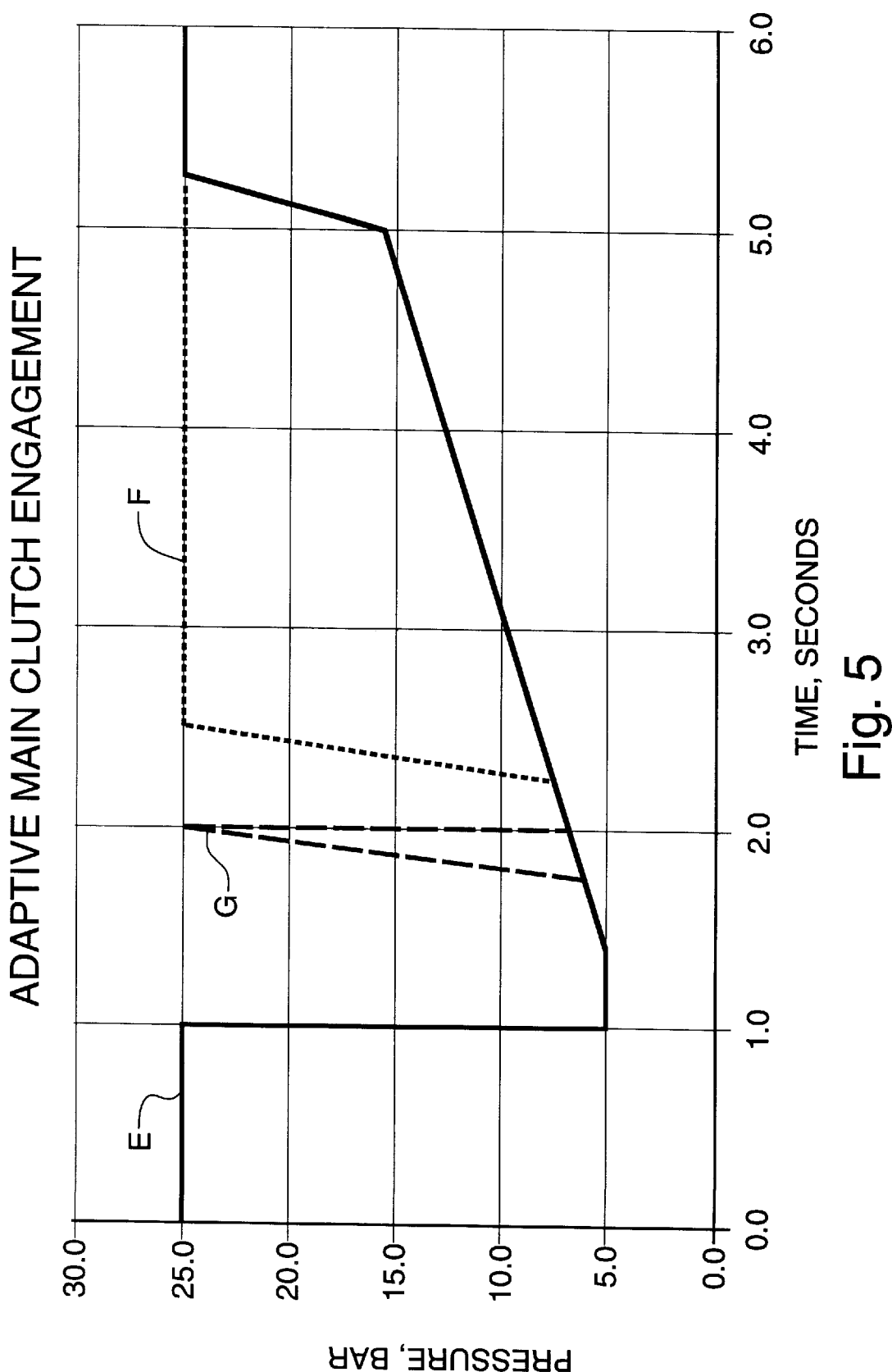
FIG. 5 is a graph illustrating the adaptive main clutch engagement.

When initially starting the rotation of the rotors 4 or when heavy crop is encountered, the following procedure can be followed. The microcomputer 30 sends a signal 38 to the solenoid actuated, electro-hydraulic proportional pressure reducing valve 55 which controls the pressure to the hydraulic (or wet) clutch 21. As seen in FIG. 3, the valve 55 opens, connects and fills the clutch 21 with a quantity of hydraulic fluid from a reservoir (not shown). After an interval of time, the clutch 21 should be synchronized and fully engaged. In the event that the load on the rotor 4 is too great and the clutch 21 is not synchronized, the microcomputer 30 will be able to compare signals 37 and 36 from the engine and rotor speed sensors 32 and 33. Upon detection of an error, a signal can be sent to 38 to the clutch valve 55 permitting more fluid to enter the clutch 21. FIGS. 3 and 5 illustrated several options available for synchronizing the clutch 21. In FIG. 3, at initial start up, the clutch 21 is filled after a signal 38 is sent to the valve 55. At approximately 60 ms, the clutch 21 should start to carry torque and transmit power. At point 'C', the clutch should be generally synchronized and begin to transmit a full load. Point D is the when the clutch 21 should be completely synchronized. Curve 'B' on FIG. 3 illustrates the clutch engagement in heavy crop conditions. In this instance, the rotor 4 may only have rotated a ½ revolution in 2 seconds. At this point, the clutch 21 is not fully synchronized and assumed to be plugged. To continue to operate the clutch 21 in this manner will damage the clutch 21 over an extended period. The microcomputer 30, receiving speed information from the rotor speed sensor 32 will increase the pressure in the clutch 21 by opening the clutch valve 55 and allowing more hydraulic fluid the enter the clutch 21. This increased pressure allows the clutch 21 to quickly synchronize and transmit the full engine torque to the rotor 4. Depending on the type of heavy conditions the rotor 4 is experiencing, the microcomputer 30 can transmit different clutch valve 55 signals. These are compared in FIG. 5 to the normal start up mode (line E in FIG. 5 and as previously discussed and seen in FIG. 3). One alternative mode allows for the periodic 'spike' (line G in FIG. 5) or brief opening of the clutch valve 55 so as to allow a quantity of hydraulic fluid to enter the clutch 21. Another mode (line F in FIG. 5) allows for the clutch valve 55 to be opened when the lack of synchronization of the clutch 21 (as previously discussed) is detected. Of course, both of these modes could be used.

The rotors 4 are heavy, large inertia parts and it is necessary during the initial rotor engagement to reduce stress on the engine, reduce stress of drives and provide smoother (and more pleasing) to the operator during initial start up period. To accomplish this the microcomputer can also slowly engage the rotors 4. For instance, even though an operator may request a rotor speed that is very high, the microcomputer temporarily changes the hydraulic pump swash plate to engage the rotors 4 at a slower speed. The clutch 21 is engaged until synchronous (at a lower than operator desired speed). Finally the hydraulic pump swash plate is adjusted to the originally desired speed. In this manner the clutch 21 only has to speed up the rotor partially and the hydraulic pump and motor speeds up the rotor the remainder.

It will be obvious to those skilled in the art that various changes may be made without departing from the scope of the invention and the invention is not to be considered limited to what illustrated in the drawings and described in the specification.

What is claimed is:

1. A hydro-mechanical transmission system for an agricultural combine, comprising:
   a. an engine having an engine drive shaft;
   b. a hydrostatic pump operably connected to the engine drive shaft;
   c. a hydrostatic motor having a motor output shaft, the motor operably connected to the hydrostatic pump;
   d. a clutch operably connected to the engine drive shaft and a main output gear;
   e. a hydro-mechanical planetary drive having a rotor drive shaft and operably connected to the main output gear and to the motor output shaft;
   f. a rotor bevel gearbox having a rotor gearbox output shaft and operably connected to the rotor drive shaft;
   g. a rotor operably connected the rotor gearbox output shaft; and
   h. a microcomputer further comprising:
      i. a means for receiving an engine sensor signal from an engine sensor;
      ii. a means for receiving a rotor sensor signal from a rotor sensor,
      iii. a means for sending a signal to the hydrostatic pump,
      iv. a means for sending a signal to a means for controlling the clutch and
      v. a means for sending a signal to a means for controlling the hydro-mechanical planetary drive.

2. The hydro-mechanical transmission system described in claim 1 wherein the hydro-mechanical planetary drive further comprises:
   a. a ring gear operably connected to the main output gear;
   b. a sun gear operably connected to the motor output shaft; and
   c. a carrier gear operably connected to the rotor drive shaft.

3. The hydro-mechanical transmission system described in claim 2 wherein the means for controlling the hydro-mechanical planetary drive further comprises:
   a. a valve receiving the signal for controlling the hydro-mechanical planetary drive; and
   b. a means for braking the ring gear, said means operably connected the valve.

4. The hydro-mechanical transmission system described in claim 3 wherein the means for braking further comprises a piston and a cylinder contacting a brake, said brake affixed to the ring gear, said piston and cylinder operably connected to the valve.

5. The hydro-mechanical transmission system described in claim 3 wherein the means for braking further comprises a park pawl contacting the ring gear, said park pawl operably connected to the valve.

6. The hydro-mechanical transmission system described in claim 4 wherein the means for controlling the clutch further comprises a clutch valve which receives the signal for controlling the clutch, the clutch valve controlling a quantity of hydraulic fluid to enter the clutch.

7. The hydro-mechanical transmission system described in claim 6 further comprising a main output shaft affixed the main output gear, said shaft operably connected to the feederhouse.

8. The hydro-mechanical transmission system described in claim 7 further comprising a first hydrostatic line operably connected between the hydrostatic pump and the hydrostatic motor and a second hydrostatic line operably connected between the hydrostatic pump and the hydrostatic motor.

9. The hydro-mechanical transmission system described in claim 8 further comprising a switch electrically connected to the microcomputer.

10. The hydro mechanical transmission system described in claim 9 wherein said microcomputer upon comparing the signal from the engine sensor to the signal from the rotor sensor can transmit the signal to the clutch valve allowing the clutch to receive the quantity of hydraulic fluid based on the rotation of the rotor.

11. In a combine harvester, said combine having a header, said header operationally connected to a threshing and separating system by a feederhouse, said threshing and separating system having a rotating rotor and said system is operationally connected to a grain tank, said grain tank operationally connected to a grain unloading system, said combine having an engine and a chaff spreader, said combine having a hydro-mechanical transmission system for rotating the rotor, said transmission system further comprising:
   a. said engine having an engine drive shaft;
   b. a hydrostatic pump operably connected to the engine drive shaft;
   c. a hydrostatic motor having a motor output shaft, the motor operably connected to the hydrostatic pump by a first hydrostatic line and second hydrostatic line;
   d. a clutch operably connected to the engine drive shaft and a main output gear;
   e. a hydro-mechanical planetary drive further comprising:
      i. a ring gear operably connected to the main output gear;
      ii. a sun gear operably connected to the motor output shaft; and iii. a carrier gear operably connected to a rotor drive shaft;
f. a rotor bevel gearbox having a rotor gearbox output shaft and operably connected to the rotor drive shaft;
g. a rotor operably connected the rotor gearbox output shaft; and
h. a microcomputer further comprising:
   i. a means for receiving an engine sensor signal from an engine sensor;
   ii. a means for receiving a rotor sensor signal from a rotor sensor,
   iii. a means for sending a signal to the hydrostatic pump,
   iv. a means for sending a signal to a clutch valve which receives the signal for controlling the clutch, the clutch valve controlling a quantity of hydraulic fluid to enter the clutch and
   v. a means for sending a signal to a valve, said valve operably connected to a piston and a cylinder, said piston and cylinder contacting a brake, said brake affixed to the ring gear.

12. The improvement in claim 11 wherein the microcomputer sends the signal to the clutch valve if the signal from the rotor sensor indicates that rotor is rotating less than ½ a rotation in two seconds, whereby the quantity of hydraulic fluid enters the clutch.

13. The improvement in claim 12 wherein the microcomputer sends the signal to the valve and sends the signal to the hydrostatic pump when the signal from the rotor sensor indicates that the rotor is not rotating, whereby the ring gear is braked and the hydrostatic pump and hydrostatic motor are reversed, thus reversing the rotation of the rotor.

14. A hydro-mechanical transmission system for an agricultural harvester comprising:
a. an engine having an engine drive shaft;
b. a gear box further comprising:
   i. a clutch operably connected to the engine drive shaft,
   ii. a rotor drive shaft, and
   iii. a means for driving the rotor drive shaft further comprising:
      a main output gear operably connected to the clutch; and
      a belt operably connected between the main output gear and rotor drive shaft;
c. a means for controlling the clutch further comprising a microcomputer having a means for sending a signal to said means for controlling the clutch and a clutch valve which receives the signal for controlling the clutch. the clutch valve controlling a quantity of hydraulic fluid to enter the clutch; and
d. a rotor operably connected to the rotor drive shaft.

15. The hydro-mechanical transmission system as described in claim 14 wherein said means for driving the rotor drive shaft further comprises:
a. a hydrostatic pump operably connected to the engine drive shaft;
b. a hydrostatic motor having a motor output shaft operably connected to the hydrostatic pump;
c. a main output gear operably connected to the clutch; and
d. a hydro-mechanical planetary drive further comprising:
   i. a ring gear operably connected to the main output gear;
   ii. a sun gear operably connected to the motor output shaft; and
   iii. a carrier gear operably connected to the rotor drive shaft.

16. The hydro-mechanical transmission system described in claim 15 wherein the microcomputer further comprises:
a. a means for receiving an engine sensor signal from an engine sensor;
b. a means for receiving a rotor sensor signal from a rotor sensor;
c. a means for sending a signal to the hydrostatic pump; and
d. a means for sending a signal to a means for braking the ring gear.

17. The hydro-mechanical transmission system described in claim 16 wherein the means for braking the ring gear further comprises:
a. a valve receiving the signal for the means for braking the ring gear; and
b. a piston and a cylinder contacting a brake, said brake affixed to the ring gear, said piston and cylinder operably connected to the valve.

18. The hydro-mechanical transmission system described in claim 17 further comprising a main output shaft affixed the main output gear, said shaft operably connected to the feederhouse.

* * * * *